(12) United States Patent
Meyer et al.

(10) Patent No.: US 8,938,557 B2
(45) Date of Patent: Jan. 20, 2015

(54) METHOD FOR CONFIGURING FIELD DEVICES

(75) Inventors: Christian Meyer, Laatzen (DE); Stefan Bollmeyer, Minden (DE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 12/781,507

(22) Filed: May 17, 2010

(65) Prior Publication Data
US 2010/0293363 A1     Nov. 18, 2010

Related U.S. Application Data

(62) Division of application No. 11/792,816, filed on Jun. 12, 2007, now Pat. No. 7,783,790.

(30) Foreign Application Priority Data

Dec. 23, 2004   (DE) .......................... 10 2004 062 147
Dec. 21, 2005   (DE) .......................... 10 2005 061 615

(51) Int. Cl.
  *G06F 3/00*      (2006.01)
  *G05B 19/042*    (2006.01)

(52) U.S. Cl.
  CPC ................................. *G05B 19/0426* (2013.01)
  USPC ...................... 710/8; 710/10; 700/28; 700/30

(58) Field of Classification Search
  None
  See application file for complete search history.

(56) References Cited

U.S. PATENT DOCUMENTS

| 5,521,588 | A | 5/1996 | Kuhner et al. |
| 6,061,809 | A * | 5/2000 | Glaser et al. ..................... 714/11 |
| 6,449,624 | B1 | 9/2002 | Hammack et al. |
| 7,447,760 | B2 | 11/2008 | Forth et al. |
| 2003/0107417 | A1* | 6/2003 | Roberts et al. ................. 327/144 |
| 2004/0022210 | A1* | 2/2004 | Frank et al. ................... 370/328 |
| 2005/0027377 | A1 | 2/2005 | Lucas et al. |
| 2005/0040248 | A1* | 2/2005 | Wacker et al. .................. 236/51 |
| 2006/0129781 | A1 | 6/2006 | Gellai et al. |

FOREIGN PATENT DOCUMENTS

| EP | 0612004 | 8/1994 |
| EP | 1246057 | 10/2002 |

OTHER PUBLICATIONS

International Preliminary Report on Patentability (Form PCT IB/373—1 sheet) and accompanying Written Opinion (Form PCT/ISA/237—8 sheets), issued in corres. PCT/EP2005/014008, Jun. 26, 2007, The International Bureau of WIPO, Geneva CH.

* cited by examiner

*Primary Examiner* — Idriss N Alrobaye
*Assistant Examiner* — Dayton Lewis-Taylor
(74) *Attorney, Agent, or Firm* — Buchanan Ingersoll & Rooney PC

(57) ABSTRACT

The disclosure relates to a method for configuring field devices in a process automation system wherein the field devices are connected to other automation components by means of a field bus. In order to minimize the load placed on the field bus, a copy of the current configuration of each field device is stored in a configuration tool, the appropriate set of configuration and parameter data is transmitted to each field device during initial start-up and modifications in relation to the previous copy of the configuration and parameter data are transmitted to the respective field device.

7 Claims, 2 Drawing Sheets

METHOD FOR CONFIGURING FIELD DEVICES

RELATED APPLICATION

This application is a divisional of U.S. application Ser. No. 11/792,816, filed on Jun. 12, 2010, the content of which is herein incorporated in its entirety by reference.

FIELD

The invention relates to a method for configuring field devices in a process automation system.

BACKGROUND

Modern process automation systems as used in the chemical, petroleum and other process industries employ intelligent field equipment, sensors and actuators. These field devices, as they are known, are connected together and to the rest of the process automation system components via a fieldbus system or other communications installations.

SUMMARY

The automation functions, which are essentially control loops, are distributed across these field devices. The potential use in hazardous areas, in particular, places limits on the resources of the field devices for storing the configuration and parameters, and on the transmission bandwidth of the fieldbus systems. A configuration tool having a central configuration database is used for configuring and parameterizing the process automation system. This configuration tool can be used to configure the process automation functions, including the configurations and parameters of the field devices, before any communications link has been established with the field devices (offline configuration). In a subsequent step, the configuration tool is then connected to the fieldbus, and the configurations and parameters are downloaded to the field devices. This download process must include synchronization with data already held in the device, for example preconfigured data.

The configuration is generated on the basis of device description data in order to take into account the specific properties of the field devices. This device description data is normally kept in machine-readable form as a file.

Process automation systems are used for critical, continuous processes, in which the automation function can only be stopped in certain situations. The use of resource-limited field devices on a fieldbus with a highly restricted bandwidth requires special techniques in order to be able to download changes in configuration data and parameter data to the field devices via the fieldbus, even during normal operation, without stopping the automation function.

The object of the invention is to define a method for configuring field devices in the process automation system, wherein the loads placed on the communications links are minimized.

This object is achieved according to the invention by the features of claim 1. Advantageous embodiments of the invention are given in the dependent claims.

The invention is based on a configuration tool having a central configuration database, where the said configuration tool can be used to configure the process automation functions, including the configurations and parameters of the field devices, before any communications link has been established with the field devices. The invention is also based on the condition that all configurations are set in the configuration tool.

The configuration tool uses copies of field-device configuration data and parameters, which reflect the most recent download status of the field devices. Such a copy is recorded once only for each field device.

DESCRIPTION OF THE DRAWINGS

In the following, exemplary embodiments are described in reference to the drawings wherein.

DETAILED DESCRIPTION

Figure 1:
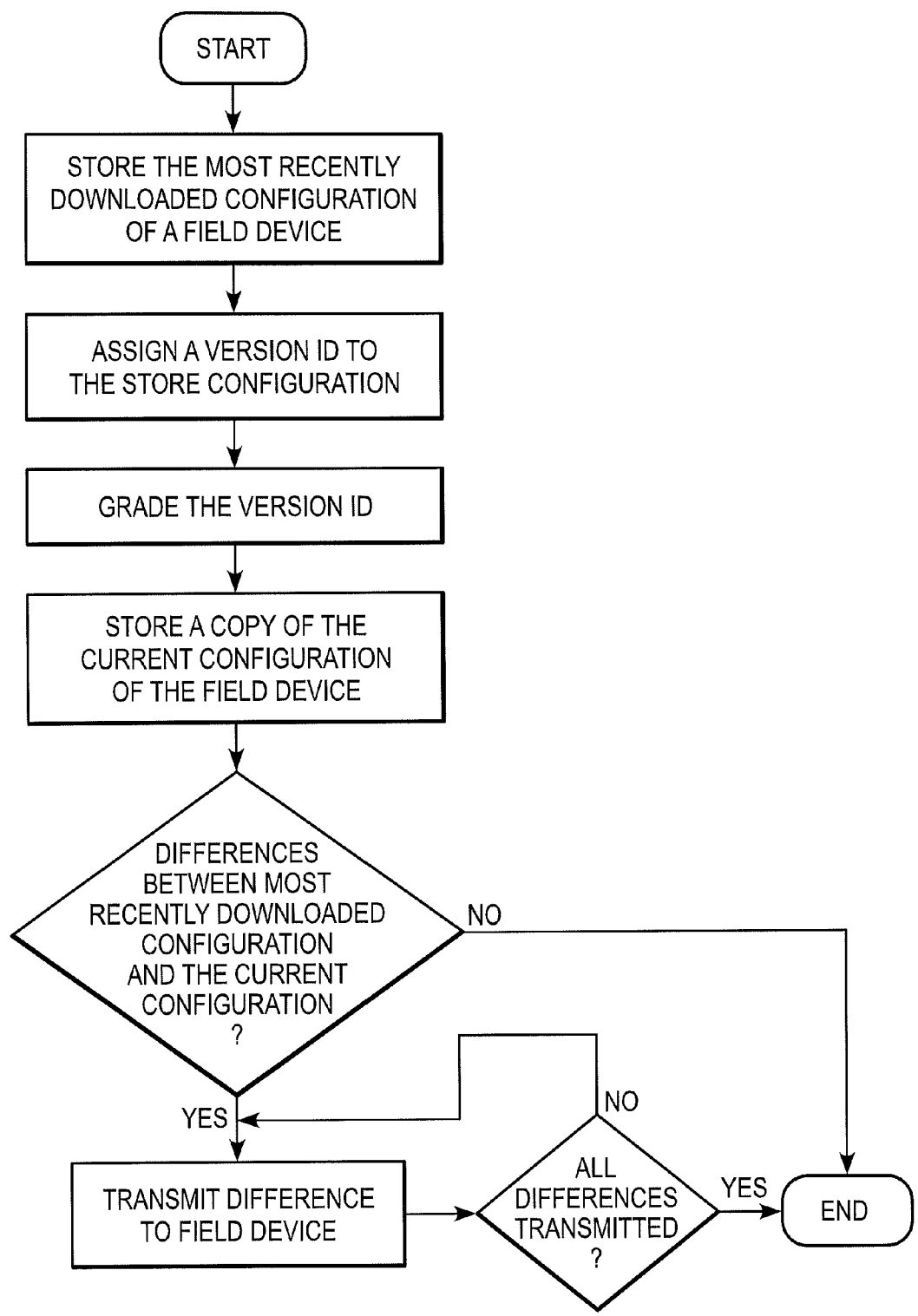
FIG. 1 illustrates a first method of configuring field devices in a process automation system.
Figure 2:
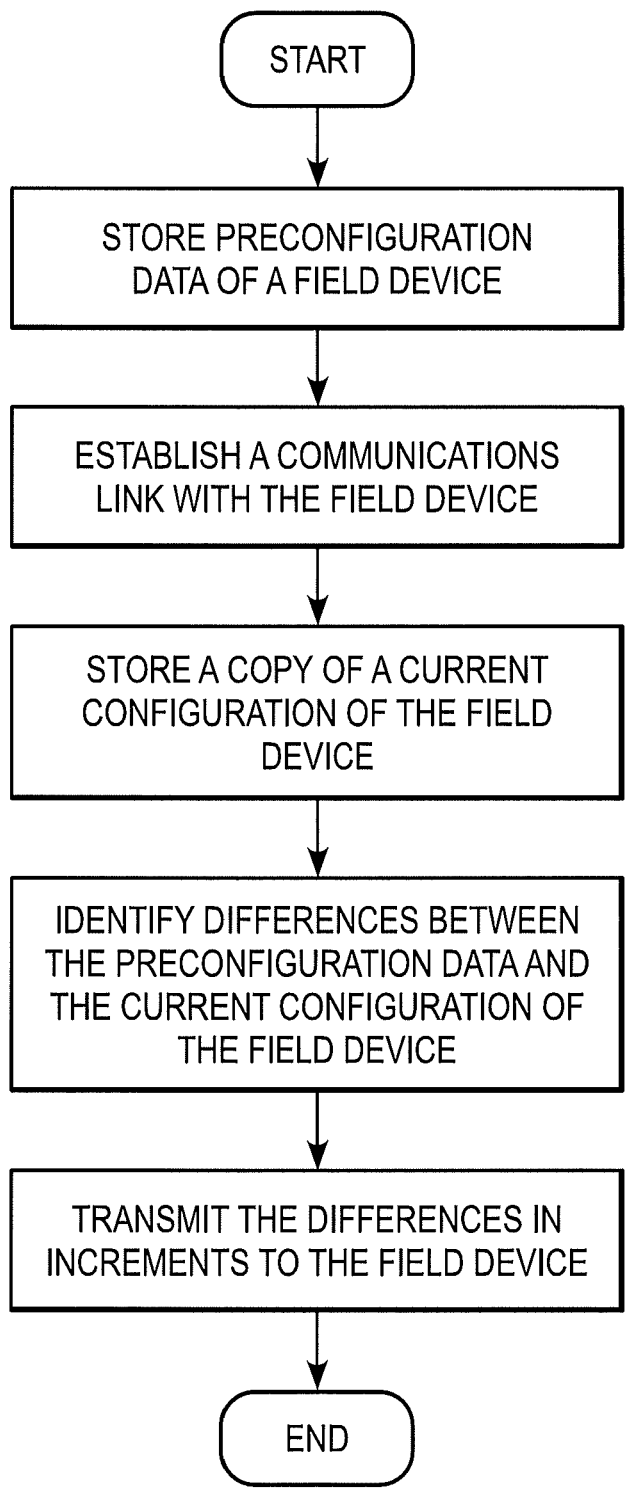
FIG. 2 illustrates second method of configuring field devices in a process automation system.

As illustrated in FIGS. 1 and 2, configuration changes are copied by the configuration tool into the configuration entries and parameter entries of the field devices in such a way as to minimize the impact on the running process automation functions of the whole system, and also to reduce the download operations required until the new configuration in the field devices is obtained.

Configuration changes are copied by the configuration tool into the configuration entries and parameter entries of the field devices in such a way as to minimize the impact on the running process automation functions of the whole system, and also to reduce the download operations required until the new configuration in the field devices is obtained.

To achieve this, a copy of the most recently downloaded configuration of each field device is initially stored in the configuration tool in a once-only step. By this means, even field devices already integrated in the process automation plant and in operation can subsequently be included in the configuration by means of said configuration tool.

Field devices being added are provided initially with the minimum configuration data and parameter data required for first-time start-up. This data constitutes the most recently downloaded configuration of the field device and is consequently stored as the copy in the configuration tool.

Subsequently, configuration changes and parameter changes from the configuration tool are only transferred as increments to the most recently downloaded configuration.

The increments are generated in the configuration tool on the basis of copies of field-device configuration data, which reflect the most recent download status of the field devices. The increments are chosen here so as to minimize the impact on the process controlled by the system and also to minimize the transmission times by changes being as small as possible.

In detail, this is achieved as follows: initially, a copy of the current configuration of each field device is stored in the configuration tool; in the next step, the difference is determined between the current configuration and the most recently downloaded configuration of the same field device; finally, the determined difference is transmitted to the respective field device for updating the configuration data and parameter data as required. These three steps are repeated recursively for each new configuration.

The generated configuration may use, for implementing the same automation function, more configuration entries than a configuration that does not take account of the current configuration of the field devices. This means, however, that the download operations required to obtain the new configuration in the field devices can be reduced, and the impact on the process automation function of the whole system can be minimized.

By means of the method described here, changes that were made without a communications link to the field devices (offline) can be incrementally downloaded to the devices or synchronized with the data held in the devices, without needing to interrupt the process automation function of the whole system.

According to a further feature of the invention, it is provided to assign a version ID to each copy of a configuration. This simplifies management of a large number of configurations in the configuration database.

According to a further feature of the invention, it is provided that the version IDs are managed by each field device itself, or are changed implicitly by download operations.

According to a further feature of the invention, it is provided that the version IDs are downloaded to the field devices with the configuration data by the configuration tool.

In this case, it can be provided that the extent of the as-required update of the configuration data and parameter data is determined by the configuration tool from the version IDs and the copy of the most recently downloaded configuration.

In a preferred embodiment of the invention, the version IDs are graded. The grading is based on the knowledge that a device configuration for a modern, complex field device has a certain detectable granularity that is reflected in properties of objects. In this case it is provided that, in addition to the situation where the whole configuration has changed, the change in objects is also identified if at least one property has changed.

The extent of the as-required update of the configuration data and parameter data is determined dynamically from the grades of the version IDs by establishing those objects whose properties have been changed. This advantageously simplifies the process of determining the required update extent.

The invention claimed is:

1. A method for configuring at least one field device in a process automation system, in which the at least one field device is connected to other automation components via a fieldbus, which makes use of a configuration tool, comprising:

storing a copy of an offline configuration of the at least one field device in the configuration tool prior to the configuration tool being connected to the fieldbus;

establishing a connection with the at least one field device via the fieldbus;

storing a copy of an online configuration of the at least one field device in the configuration tool;

assigning a version identifier to the copy of the online configuration, wherein the version identifier is graded based on a change in an object property;

determining plural differences between an online configuration of the at least one field device and the offline configuration of the at least one field device, wherein determining the plural differences includes identifying differences in properties between selected objects; and transmitting the plural differences to the at least one field device in increments to update configuration data and parameter data of the at least one field device.

2. The method of claim 1, wherein the transmission increments are selected to be of a size that minimizes transmission time.

3. The method of claim 1, further comprising:
downloading the increments of the plural differences to the at least one field device without the use of an interrupt.

4. The method of claim 1, further comprising:
synchronizing the transmitted increments with data stored in the at least one field device without the use of an interrupt.

5. The method of claim of claim 1, further comprising:
determining an extent of a next configuration update based on the grade of the version identifier.

6. The method of claim 1, further comprising:
downloading the version ID to the at least one field device with the determined plural differences.

7. The method of claim 6, further comprising:
determining differences between the online configuration and the offline configuration based on a version ID of a current configuration of the at least one field device.

* * * * *